United States Patent
Nishida

(10) Patent No.: US 11,511,643 B2
(45) Date of Patent: Nov. 29, 2022

(54) DISPLAYING AN INFLUENCE DEGREE USED TO INHIBIT THE DETERIORATION OF A SECONDARY CELL

(71) Applicant: HONDA MOTOR CO., LTD., Tokyo (JP)

(72) Inventor: Yoshikazu Nishida, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 314 days.

(21) Appl. No.: 15/930,470

(22) Filed: May 13, 2020

(65) Prior Publication Data
US 2020/0369174 A1 Nov. 26, 2020

(30) Foreign Application Priority Data
May 20, 2019 (JP) .............................. JP2019-094563

(51) Int. Cl.
| | |
|---|---|
| *B60L 58/10* | (2019.01) |
| *G09G 3/36* | (2006.01) |
| *B60K 35/00* | (2006.01) |
| *G07C 5/08* | (2006.01) |

(52) U.S. Cl.
CPC .............. *B60L 58/10* (2019.02); *B60K 35/00* (2013.01); *G07C 5/0825* (2013.01); *G09G 3/36* (2013.01); *B60K 2370/152* (2019.05); *B60K 2370/164* (2019.05); *B60K 2370/167* (2019.05); *G09G 2380/10* (2013.01)

(58) Field of Classification Search
None
See application file for complete search history.

(56) References Cited

U.S. PATENT DOCUMENTS

| | | | | |
|---|---|---|---|---|
| 7,391,183 | B2* | 6/2008 | Ariga ................... | H02J 7/0091 320/124 |
| 8,190,325 | B2* | 5/2012 | Crombez ............... | B60L 50/16 340/439 |
| 8,232,875 | B2* | 7/2012 | Uchida .................. | B60L 50/16 320/109 |
| 9,956,887 | B2* | 5/2018 | Duan .................... | B60L 58/12 |
| 10,549,636 | B2* | 2/2020 | Skaff .................... | G09B 19/167 |

(Continued)

FOREIGN PATENT DOCUMENTS

| | | |
|---|---|---|
| JP | 10-004603 | 1/1998 |
| JP | 2005-227141 | 8/2005 |

(Continued)

OTHER PUBLICATIONS

Japanese Office Action for Japanese Patent Application No. 2019-094563 dated Feb. 15, 2022.

*Primary Examiner* — Jason A Pringle-Parker
(74) *Attorney, Agent, or Firm* — Amin, Turocy & Watson, LLP

(57) ABSTRACT

An influence degree display device includes an acquirer configured to acquire information regarding magnitude of an influence factor that has an influence on progress of deterioration of a secondary cell that stores power used to drive an electric motor vehicle a display configured to display an image and a display controller configured to cause the display to display an image indicating the degree of influence on the progress of the deterioration of the secondary cell in accordance with the acquired magnitude of the influence factor.

10 Claims, 8 Drawing Sheets

(56) References Cited

U.S. PATENT DOCUMENTS

| | | | |
|---|---|---|---|
| 10,598,734 B2* | 3/2020 | Newman | G01R 31/396 |
| 2009/0040033 A1* | 2/2009 | Uchida | B60K 6/28 |
| | | | 340/439 |
| 2012/0121952 A1* | 5/2012 | Majima | G01R 31/392 |
| | | | 429/90 |
| 2013/0085696 A1* | 4/2013 | Xu | H04Q 9/00 |
| | | | 702/63 |
| 2013/0179840 A1* | 7/2013 | Fisher | G06F 3/04817 |
| | | | 715/835 |
| 2014/0088896 A1* | 3/2014 | Hu | G01R 31/3835 |
| | | | 702/63 |
| 2015/0046107 A1* | 2/2015 | Jo | G01R 31/367 |
| | | | 702/63 |
| 2015/0149221 A1* | 5/2015 | Tremblay | G06Q 10/02 |
| | | | 320/109 |
| 2015/0360578 A1* | 12/2015 | Duan | B60L 58/12 |
| | | | 340/455 |
| 2017/0092996 A1* | 3/2017 | Rodriguez | H02J 7/0048 |
| 2019/0057071 A1* | 2/2019 | Fleming | H04N 21/64761 |
| 2019/0334353 A1* | 10/2019 | Solomon | H02J 7/00 |
| 2021/0271303 A1* | 9/2021 | Vichare | G06F 1/28 |

FOREIGN PATENT DOCUMENTS

| | | |
|---|---|---|
| JP | 2007-274806 | 10/2007 |
| JP | 2013-172476 | 9/2013 |

\* cited by examiner

DISPLAYING AN INFLUENCE DEGREE USED TO INHIBIT THE DETERIORATION OF A SECONDARY CELL

CROSS-REFERENCE TO RELATED APPLICATION

This application claims priority to and the benefit from Japanese Patent Application No. 2019-094563, filed on May 20, 2019, the contents of which are hereby incorporated by reference into the present application.

BACKGROUND

Field of the Invention

The present invention relates to an influence degree display device, an influence degree display method, and a storage medium.

Description of Related Art

Secondary cells mounted on electric motor vehicles deteriorate as the secondary cells are used. Therefore, for example, it is necessary to maintain or exchange the secondary cells. In the related art, there is a display device that displays a state in which a battery mounted on a vehicle is required to be exchanged (for example, see Japanese Unexamined Patent Application, First Publication No. 1998-4603; hereinafter referred to as Patent Document 1).

SUMMARY

When the technology disclosed in Patent Document 1 above is used, a result indicating deterioration of a secondary cell mounted on an electric motor vehicle is shown. However, a user is not informed of a cause or the like of the deterioration of a secondary cell. Therefore, it is difficult to inhibit progress of the deterioration of the secondary cell.

The present invention is devised in consideration of such circumstances and one objective of the present invention is to provide an influence degree display device, an influence degree display method, and a storage medium capable of inhibiting progress of deterioration of a secondary cell.

An influence degree display device, an influence degree display method, and a storage medium according to the present invention adopt the following configurations.

(1) According to an aspect of the present invention, an influence degree display device includes: an acquirer configured to acquire information regarding magnitude of an influence factor that has an influence on progress of deterioration of a secondary cell that stores power used to drive an electric motor vehicle; a display configured to display an image; and a display controller configured to cause the display to display an image indicating the degree of influence on the progress of the deterioration of the secondary cell in accordance with the acquired magnitude of the influence factor.

(2) In the influence degree display device according to the aspect (1), the influence factor may be an influence factor obtained by digitizing content of a driving operation by a driver of the electric motor vehicle.

(3) In the influence degree display device according to the aspect (1), the influence factor may be a power storage amount of the secondary cell.

(4) In the influence degree display device according to the aspect (1), the influence factor may be a temperature of the secondary cell.

(5) In the influence degree display device according to the aspect (1), the acquirer may acquire a plurality of the influence factors. The display controller may cause the display to display an image indicating which is the influence factor that has most influence on the progress of the deterioration of the secondary cell among the plurality of influence factors in response to a predetermined operation.

(6) In the influence degree display device according to the aspect (1), the display controller may cause the display to display the image indicating the degree of influence on the progress of the deterioration of the secondary cell a display color of the image being changed in accordance with the magnitude of the influence factor.

(7) The influence degree display device according to the aspect (1) may further include a predictor configured to predict a future remaining value of the secondary cell. The display controller may cause the display to display an image which is based on the future remaining value of the secondary cell.

(8) In the influence degree display device according to the aspect (7), in a case where an operation is performed on a remaining value display switch, the display controller may cause the display to perform display by causing the display to display the image which is based on the future remaining value of the secondary cell along with the image indicating the degree of influence on the progress of the deterioration of the secondary cell.

(9) According to another aspect of the present invention, there is provided an influence degree display method causing a computer to perform control by: acquiring information regarding magnitude of an influence factor that has an influence on progress of deterioration of a secondary cell that stores power used to drive an electric motor vehicle; and causing a display to display an image indicating the degree of influence on the progress of the deterioration of the secondary cell in accordance with the acquired magnitude of the influence factor.

(10) According to still another aspect of the present invention, a computer-readable non-transitory storage medium that stores a program causing a computer: to acquire information regarding magnitude of an influence factor that has an influence on progress of deterioration of a secondary cell that stores power used to drive an electric motor vehicle; and to cause a display to displays an image indicating the degree of influence on the progress of the deterioration of the secondary cell in accordance with the acquired magnitude of the influence factor.

According to the aspects (1) to (10), it is possible to inhibit progress of deterioration of a secondary cell.

According to the aspects (2) to (5), it is possible to recognize specific measures to inhibit progress of deterioration of a secondary cell.

According to the aspect (6), it is possible to inform of an influence factor of deterioration of a secondary cell so that the influence factor can be understood. According to the aspects (7) and (8), it is possible to inform of a relation between a remaining value and deterioration of a secondary cell.

DETAILED DESCRIPTION OF THE INVENTION

Hereinafter, an influence degree display device, an influence degree display method, and a storage medium according to the present invention will be described with reference to the drawings. In the following description, a vehicle 10 is assumed to be an electric automobile, but the vehicle 10 may be an electric motor vehicle on which a secondary cell supplying traveling power is mounted or may be a hybrid automobile or a fuel cell vehicle. In the following description, a secondary cell and a battery are assumed to be synonymous.

First Embodiment

[Vehicle 10]

Figure 1:
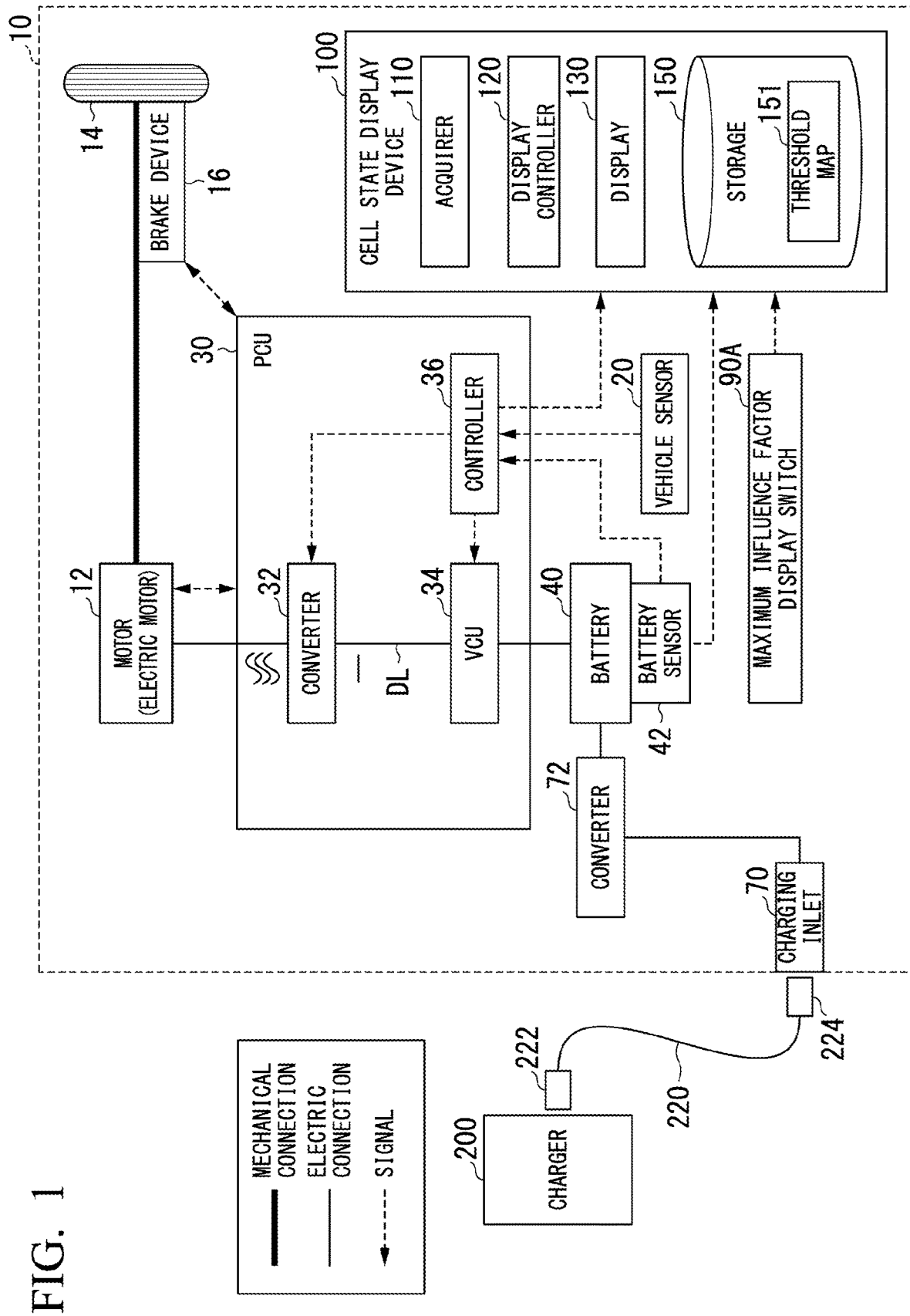
FIG. 1 is a diagram showing an example of a configuration of a vehicle according to a first embodiment.

FIG. 1 is a diagram showing an example of a configuration of the vehicle 10 including an influence degree display device 100 according to a first embodiment. As shown in FIG. 1, the vehicle 10 includes, for example, a motor 12, a driving wheel 14, a brake device 16, a vehicle sensor 20, a power controller (PCU) 30, a battery 40, a battery sensor 42 such as a voltage sensor, a current sensor, or a temperature sensor, a charging inlet 70, a converter 72, a steering switch 90, and the influence degree display device 100.

The motor 12 is, for example, a three-phrase alternating-current motor. A rotor of the motor 12 is connected to the driving wheel 14. The motor 12 outputs motive power to the driving wheel 14 using supplied electric power. The motor 12 generates power using kinetic energy when the vehicle is decelerating.

The brake device 16 includes, for example, a brake caliper, a cylinder that transmits a hydraulic pressure to the brake caliper, and an electronic motor that generates a hydraulic pressure to the cylinder. The brake device 16 may include a mechanism that transmits a hydraulic pressure generated in response to an operation of the brake pedal to the cylinder via a master cylinder as a backup. The brake device 16 is not limited to the above-described configuration and may be an electronic control type hydraulic brake device that transmits a hydraulic pressure of the master cylinder to the cylinder. When the brake device 16 operates, the motor 12 generates regeneration current. The battery 40 is charged with the regeneration current.

The vehicle sensor 20 includes an accelerator opening sensor, a vehicle speed sensor, and a brake stepping quantity sensor. The accelerator opening sensor is fitted in an accelerator pedal which is an example of an operator receiving an acceleration instruction from a driver, detects an operation amount of the accelerator pedal, and outputs the operation amount as an acceleration opening to a controller 36. The vehicle speed sensor includes, for example, a speed calculator and a vehicle wheel speed sensor fitted in each vehicle wheel, integrates the vehicle wheel speeds detected by the vehicle wheel speed sensors, derive a speed of the vehicle (vehicle speed), and outputs the vehicle speed to the controller 36. The brake stepping quantity sensor is fitted in a brake pedal, detects an operation amount of the brake pedal, and outputs the operation amount as a brake stepping quantity to the controller 36.

The PCU 30 includes, for example, a transducer 32, a voltage control unit (VCU) 34, and the controller 36. These constituent elements configured as a bundle of the PCU 30 are merely exemplary. The constituent elements may be disposed in a distributed manner.

The transducer 32 is, for example, an AC-DC converter. A direct-current side terminal of the transducer 32 is connected to a direct-current link DL. The battery 40 is connected to the direct-current link DL via the VCU 34. The transducer 32 converts an alternating current generated by the motor 12 into a direct current and outputs the direct current to the direct-current link DL.

The VCU 34 is, for example, a DC-DC converter. The VCU 34 boosts power supplied from the battery 40 and outputs the boosted power to the direct-current link DL.

The controller 36 includes, for example, a motor controller, a brake controller, and a battery VCU controller. The motor controller, the brake controller, and the battery VCU controller may be substituted with separate control devices, for example, control devices such as a motor ECU, a brake ECU, and a battery ECU.

The motor controller controls the motor 12 based on an output of the vehicle sensor 20. The brake controller controls the brake device 16 based on an output of the vehicle sensor 20 and calculates a travel load. The battery VCU controller calculates a state of charge (SOC) indicating a charging amount of the battery 40 based on an output of the battery sensor 42 fitted in the battery 40. In the battery VCU control, the calculated SOC is output to the VCU 34 and the influence degree display device 100. The VCU 34 increases a voltage of the direct-current link DL in response to an instruction from the battery VCU controller. The controller 36 outputs a vehicle speed output by the vehicle speed sensor to the influence degree display device 100.

The battery 40 is, for example, a secondary cell such as a lithium ion battery. The battery 40 stores power introduced from an external charger 200 of the vehicle 10 and performs discharging for traveling of the vehicle 10. The battery sensor 42 includes, for example, a current sensor, a voltage sensor, and a temperature sensor. The battery sensor 42 detects, for example, a current value, a voltage value, and a temperature of the battery 40. The battery sensor 42 outputs the detected current value, voltage value, temperature, and the like of the battery 40 to the controller 36. The battery sensor 42 outputs the detected current value and temperature of the battery 40 to the influence degree display device 100.

The charging inlet 70 is provided to face the outside of the body of the vehicle 10. The charging inlet 70 is connected to a charger 200 via a charging cable 220. The charging cable 220 includes a first plug 222 and a second plug 224. The first plug 222 is connected to the charger 200 and the second plug 224 is connected to the charging inlet 70. Electricity supplied from the charger 200 is supplied to the charging inlet 70 via the charging cable 220.

The charging cable 220 includes a signal cable attached to a power cable. The signal cable relays communication between the vehicle 10 and the charger 200. Accordingly, a power connector and a signal connector are provided in each of the first plug 222 and the second plug 224.

The converter 72 is provided between the battery 40 and the charging inlet 70. The converter 72 converts a current introduced from the charger 200 via the charging inlet 70, for example, an alternating current, into a direct current. The converter 72 outputs the converted direct current to the battery 40.

The steering switch 90 includes a maximum influence factor display switch 90A. The maximum influence factor display switch 90A outputs, for example, maximum influence factor display information to the influence degree display device 100 in response to a pressing operation by the driver.

Figure 2:
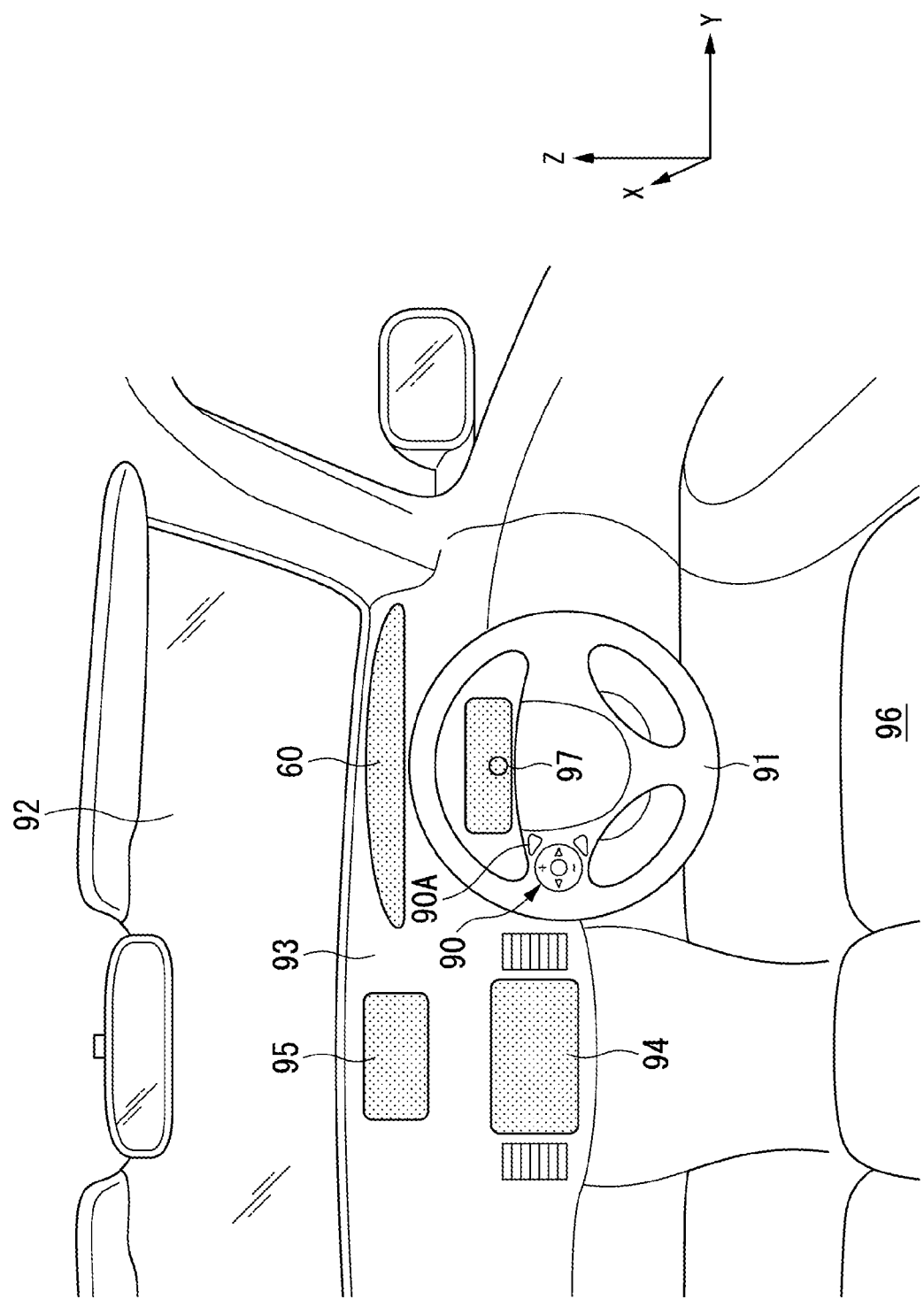
FIG. 2 is a diagram showing a configuration of an interior of the vehicle according to the first embodiment.

FIG. 2 is diagram showing a configuration of the interior of the vehicle 10 according to the first embodiment. As shown in FIG. 2, for example, a display device 60, a steering switch 90, a steering wheel 91 controlling steering of the vehicle 10, a front windshield 92 demarcating the vehicle exterior and interior, an instrument panel 93, a first display device 94, a second display device 95, and an in-wheel area display 97 are provided in the vehicle 10.

The display device 60 is disposed in, for example, a meter panel unit including meters such as a vehicle speed meter provided in the instrument panel 93 for the front of a driving seat. The steering switch 90 is disposed in the steering wheel 91. The steering switch 90 is an input device disposed at a position at which an operation can be performed with fingers of the driver gripping the steering wheel 91. A plurality of switches including the maximum influence factor display switch 90A in the steering switch 90 are included. The maximum influence factor display switch 90A is disposed at a right end in the steering switch 90.

The front windshield 92 is a member that has a light transmission property. The first display device 94 and the second display device 95 are provided near the left front of the driving seat 96 in the instrument panel 93 inside the vehicle.

The first display device 94 is, for example, a liquid crystal display disposed in the middle portion of the instrument panel 93. The first display device 94 is, for example, a touch panel that receives an input operation when a finger of the operator touches. The first display device 94 displays, for example, an image corresponding to a navigation process performed by a navigation device (not shown) mounted in the vehicle 10 or displays a video of a partner in a videophone.

The second display device 95 is a liquid crystal display disposed above the first display device 94 in the instrument panel 93. The second display device 95 is, for example, a touch panel that receives an input operation when a finger of the operator touches. The second display device 95 is disposed at a position at which the driver of the vehicle 10 can see more easily than the first display device 94. The second display device 95 is disposed at a position at which the driver who is driving the vehicle 10 can see with a less vision movement than the first display device 94. The second display device 95 is disposed at, for example, a position closer to the front windshield 92 or a position closer to a gazing range in front of the driver at an appropriate driving posture than the first display device 94. The second display device 95 displays a television program, reproduces a DVD, or displays contents such as a downloaded movie.

The in-wheel area display 97 is disposed, for example, in an upper portion of the steering wheel 91. For example, a vehicle speed or the like of the vehicle 10 is displayed on the in-wheel area display 97. The display device 60 may be disposed at another position such as a position at which the in-wheel area display 97 is disposed. Display content of each display device of the display device 60, the first display device 94, the second display device 95, and the in-wheel area display 97 may be appropriately exchanged.

[Influence Degree Display Device 100]

As shown in FIG. 1, the influence degree display device 100 includes an acquirer 110, a display controller 120, a display 130, and a storage 150. The acquirer 110 and the display controller 120 are realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device (a non-transitory storage medium) such as an HDD or a flash memory or may be stored in a detachably mounted storage medium (a non-transitory storage medium) such as a DVD, a CD-ROM, or the like so that the storage medium is mounted on a drive device to be installed on the HDD or the flash memory. The storage 150 is realized by the above-described storage device. The storage 150 stores various kinds of information including the threshold map 151.

The acquirer 110 acquires a current value and a temperature of the battery 40 output by the battery sensor 42. The acquirer 110 acquires an SOC of the battery 40 output by the controller 36. The current value, the temperature, and the SOC of the battery 40 are information regarding the magnitude of an influence factor having an influence on progress of deterioration of the battery 40. The acquirer 110 acquires a vehicle speed of the vehicle 10 output by the controller 36 along with the current value, the temperature, and the SOC of the battery 40.

The current value acquired by the acquirer 110 and used to charge or discharge the battery 40 is detected by the battery sensor 42 and is output. When the vehicle 10 is suddenly accelerated, a substantial current is supplied to the motor 12. Therefore, a current from which the battery 40 is discharged increases. When the vehicle 10 is suddenly decelerated, a regenerated current with which the battery 40 is charged increases. Therefore, for example, detection of discharging of a large current by the battery sensor 42 during traveling of the vehicle 10 means that a driving operation of a driver is sudden acceleration. For example, detection of charging of a large regenerative current by the battery sensor 42 during traveling of the vehicle 10 means that a driving operation of the driver is sudden deceleration. Accordingly, a current value of the battery 40 is a value obtained by digitizing operation content of the driver of the vehicle 10 and is an influence factor having an influence on progress of deterioration of the battery 40.

The battery 40 deteriorates as the value of the SOC becomes higher. When the SOC of the battery 40 is in a state near the middle between 0% to 100%, the deterioration of the battery 40 barely progresses. When the SOC is high and is in a state close to a 100% state (a fully charged state), the deterioration of the battery 40 easily progresses. Therefore, each of the temperature and the SOC of the battery 40 is an influence factor having an influence on the progress of the deterioration of the battery 40.

The display controller 120 calculates the degree of influence on progress of the deterioration (hereinafter referred to as a deterioration influence degree) in the battery 40 based on the current value, the temperature, and the SOC of the battery 40 output by the acquirer 110. The display controller 120 calculates, for example, a deterioration influence degree DI of the battery 40 using Expression (1) below:

$$DI = f(\alpha 1 \times DF1 + \alpha 2 \times DF2 + \alpha 3 \times DF3) \quad (1),$$

DI: deterioration influence degree;
DF1 to DF3: magnitudes of influence factors (the current value, the temperature, the SOC of the battery 40); and
α1 to α3: coefficients.

For the coefficient α1 to α3 of Expression (1), appropriate values may be set based on a nature of the influence factors, past statistical data, and the like. The display controller 120 performs control such that the display 130 displays an image indicating a deterioration influence degree of the battery 40 (hereinafter referred to as a deterioration display image) for visualization with reference to the threshold map 151 in which the calculated deterioration influence degree is read from the storage 150. Further, the display controller 120 performs control such that the display 130 displays an image indicating a vehicle speed output by the controller 36 (hereinafter referred to as a vehicle speed image).

Figure 3:
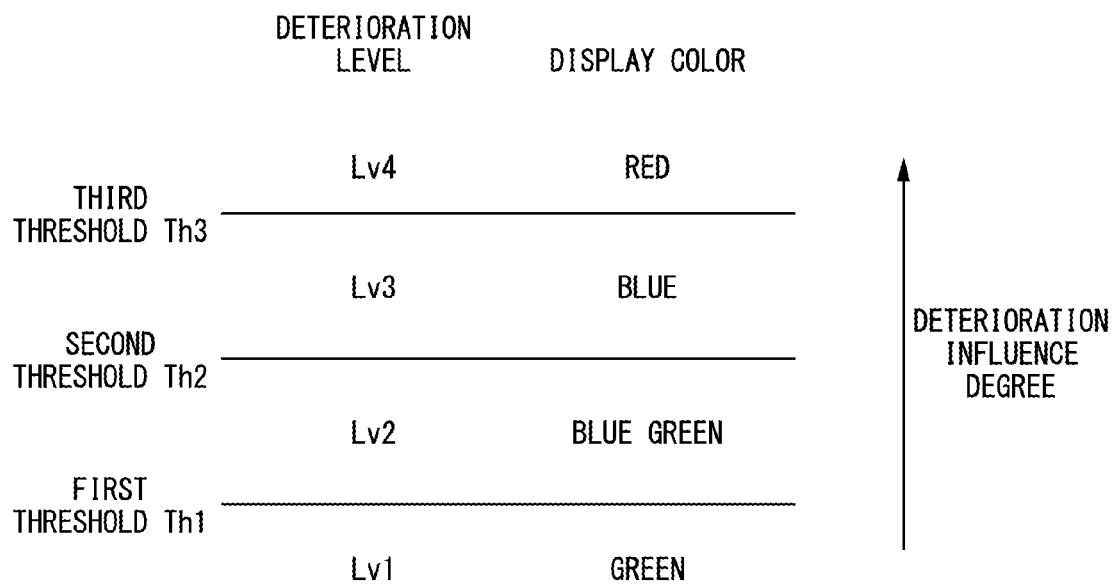
FIG. 3 is a diagram showing an example of a threshold map.

Here, the threshold map 151 stored in the storage 150 will be described. The threshold map 151 is a map indicating a threshold of the deterioration influence degree used to determine a display color of a deterioration display image. FIG. 3 is a diagram showing an example of the threshold map 151. As shown in FIG. 3, when the deterioration influence degree is less than a first threshold Th1, the display color of the deterioration display image is assumed to be "green." When the deterioration influence degree is equal to or greater than the first threshold Th1 and less than a second threshold Th2, the display color of the deterioration display image is assumed to be "blue green." When the deterioration influence degree is equal to or greater than the second threshold Th2 and less than a third threshold Th3, the display color of the deterioration display image is assumed to be "blue." When the deterioration influence degree is equal to or greater than the third threshold Th3, the display color of the deterioration display image is assumed to be "red."

The deterioration influence degree is indicated by a deterioration level and a deterioration level of the deterioration influence degree less than the first threshold Th1 is assumed to be a first deterioration level Lv1. A deterioration level of the deterioration influence degree equal to or greater than the first threshold Th1 and less than the second threshold Th2 is assumed to be a second deterioration level Lv2, a deterioration level of the deterioration influence degree equal to or greater than the second threshold Th2 and less than the third threshold Th3 is assumed to be a third deterioration level Lv3, and a deterioration level of the deterioration influence degree equal to or greater than the third threshold Th3 is assumed to be a fourth deterioration level Lv4.

Accordingly, when the deterioration level of the deterioration influence degree is the first deterioration level Lv1 and the deterioration impact is small, the display controller 120 displays the deterioration display image with "green." When the deterioration level of the deterioration influence degree is the second deterioration level Lv2 and the deterioration impact is normal, the display controller 120 displays the deterioration display image with "blue green." When the deterioration level of the deterioration influence degree is the third deterioration level Lv3 and the deterioration impact is large, the display controller 120 displays the deterioration display image with "blue." When the deterioration level of the deterioration influence degree is the fourth deterioration level Lv4 and the deterioration impact is considerable, the display controller 120 displays the deterioration display image with "red."

The display 130 is configured by, for example, the in-wheel area display 97 shown in FIG. 2. The display controller 120 causes the display 130 to display information in response to control of the display controller 120, for example, a vehicle speed image and a deterioration display image. The display controller 120 changes the display color of the deterioration display image in accordance with the calculated deterioration influence degree and causes the display 130 to display the changed display color. Instead of or in addition to the display color, another information, for example, text information, a graph, or the like, may be displayed as the deterioration display image.

When the maximum influence factor display information is output by the maximum influence factor display switch 90A, the display controller 120 causes the in-wheel area display 97 serving as the display 130 to display an image indicating the maximum influence factor having the largest influence on progress of deterioration of the battery 40 (hereinafter referred to as a maximum influence factor image). The maximum influence factor may be obtained based on a result of comparison between magnitudes of influence factors or may be obtained based on a result of a comparison between values obtained by multiplying the magnitudes of the influence factors by the coefficient α1 to α3 indicated in Expression (1).

Figure 4:
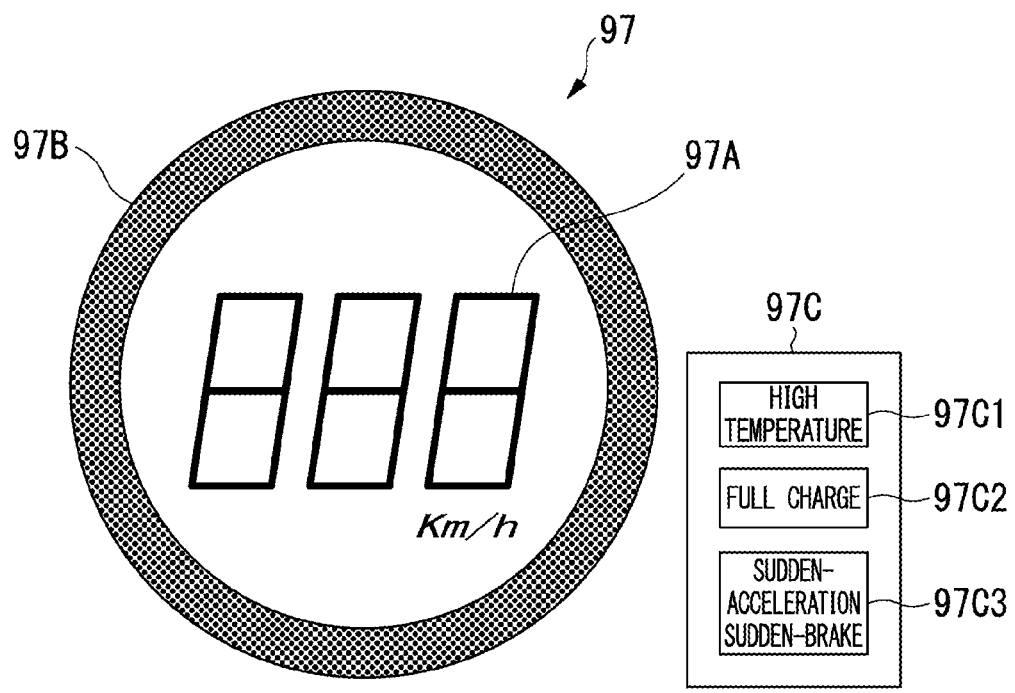
FIG. 4 is a diagram showing an image displayed on an in-wheel area display.

FIG. 4 is a diagram showing an image displayed on the in-wheel area display 97. As shown in FIG. 4, a vehicle speed image 97A, a deterioration display image 97B, and a maximum influence factor image 97C are displayed on the in-wheel area display 97. The vehicle speed image 97A is an image in which a vehicle speed of the vehicle 10 is displayed as a digital number. The vehicle speed image 97A includes a number indicating a vehicle speed and an image of text "km/h" indicating a unit of the vehicle speed.

The deterioration display image 97B is a circular image that surrounds the vehicle speed image 97A and has a thickness, and indicates the deterioration influence degree of the battery 40 with a display color of a circular thickness portion. In the example shown in FIG. 4, the display color of the deterioration display image 97B is "red" and indicates a state in which the deterioration influence degree of the battery 40 is high as the fourth deterioration level Lv4.

The maximum influence factor image 97C includes a high-temperature image 97C1, a full-charge image 97C2, and a sudden-acceleration sudden-brake image 97C3. When the maximum influence factor display switch 90A is operated, a text image of the maximum influence factor image corresponding to the maximum influence factor is displayed brightly and only frames are displayed for the other maximum influence factor images. For example, when the temperature of the battery 40 is high and the temperature of the battery 40 is a maximum influence factor, a text image of the high-temperature image 97C1 is displayed brightly and only frames are displayed for the full-charge image 97C2 and the sudden-acceleration sudden-brake image 97C3. At this time, text images of the full-charge image 97C2 and the sudden-acceleration sudden-brake image 97C3 may be displayed darkly. In FIG. 4, to facilitate description, the high-temperature image 97C1, the full-charge image 97C2, and the sudden-acceleration sudden-brake image 97C3 are all displayed, but one of the maximum influence factor images is displayed. Here, when the plurality of influence factors have an equal influence on deterioration of the battery 40 and the number of maximum influence factors is plural, the text images of the plurality of maximum influence factor images may be displayed simultaneously (displayed brightly).

Figure 5:
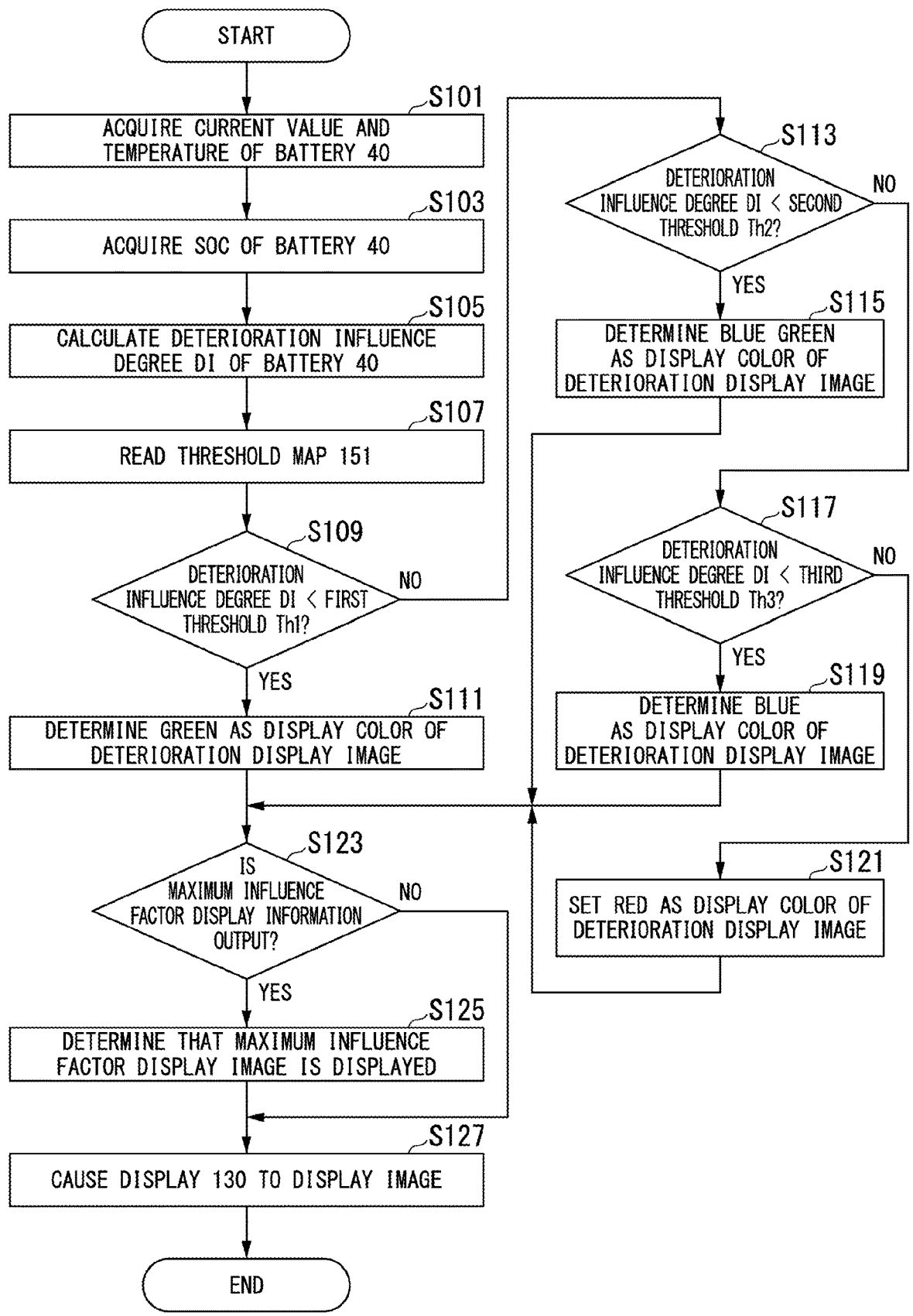
FIG. 5 is a flowchart showing an example of a flow of a process performed by an influence degree display device.

Next, a process in the influence degree display device 100 will be described. FIG. 5 is a flowchart showing an example of a process performed by the influence degree display device 100. As shown in FIG. 5 the influence degree display device 100 acquires a current value and a temperature of the battery 40 output by the battery sensor 42 in the acquirer 110 (step S101). Subsequently, the acquirer 110 acquires the SOC of the battery 40 output by the controller 36 (step S103). When the acquirer 110 acquires the SOC, the acquirer 110 acquires the SOC in accordance with a vehicle speed output by the controller 36.

Subsequently, the display controller 120 calculates the deterioration influence degree DI of the battery 40 by Expression (1) above based on each of the influence factors of the current value, the temperature, and the SOC of the battery 40 acquired by the acquirer 110 (step S105). Subsequently, the display controller 120 reads the threshold map 151 from the storage 150 (step S107) and determines whether the calculated deterioration influence degree DI is less than the first threshold Th1 with reference to the threshold map 151 (step S109). When the display controller 120 determines that the deterioration influence degree DI is less than the first threshold Th1, the display controller 120 determines the deterioration level of the deterioration influence degree as the first deterioration level Lv1 and determines "green" as the display color of the deterioration display image displayed by the display 130 (step S111).

When the display controller 120 determines that the deterioration influence degree DI is not less than the first threshold Th1 (equal to or greater than the first threshold Th1), the display controller 120 determines whether the deterioration influence degree DI is less than the second threshold Th2 (step S113). When the display controller 120 determines that the deterioration influence degree DI is less than the second threshold Th2, the display controller 120 determines the second deterioration level Lv2 as the deterioration level of the deterioration influence degree and determines "blue green" as the display color of the deterioration display image displayed by the display 130 (step S115).

When the display controller 120 determines that the deterioration influence degree DI is not less than the second threshold Th2 (equal to or greater than the second threshold Th2), the display controller 120 determines whether the deterioration influence degree DI is less than the third threshold Th3 (step S117). When the display controller 120 determines that the deterioration influence degree DI is less than the third threshold Th3, the display controller 120 determines the third deterioration level Lv3 as the deterioration level of the deterioration influence degree and determines "blue" as the display color of the deterioration display image displayed by the display 130 (step S119). When the display controller 120 determines that the deterioration influence degree DI is not less than the third threshold Th3 (equal to or greater than the third threshold Th3), the display controller 120 determines the fourth deterioration level Lv4 as the deterioration level of the deterioration influence degree and determines "red" as the display color of the deterioration display image displayed by the display 130 (step S121).

Subsequently, the display controller 120 determines whether the maximum influence factor display information is output by the maximum influence factor display switch 90A (step S123). When the display controller 120 determines that the maximum influence factor display information is output, the display controller 120 determines that an image indicating the maximum influence factor is displayed by the display 130 (step S125). When the display controller 120 determines that the maximum influence factor display information is not output, the display controller 120 causes the process to proceed directly to step S127.

Subsequently, the display controller 120 causes the display 130 to display the image (step S127). The display controller 120 causes the display 130 to display the deterioration display image of the display color determined in one of steps S111, S115, S119, and S121. When the display controller 120 determines in step S125 that the image indicating the maximum influence factor is displayed by the display 130, the display controller 120 causes the display 130 to display the maximum influence factor image. Further, the display controller 120 causes the display 130 to display a vehicle speed image in accordance with the vehicle speed acquired by the acquirer 110. In this way, the influence degree display device 100 causes the display 130 to display various images and ends the process shown in FIG. 5.

Figure 6:
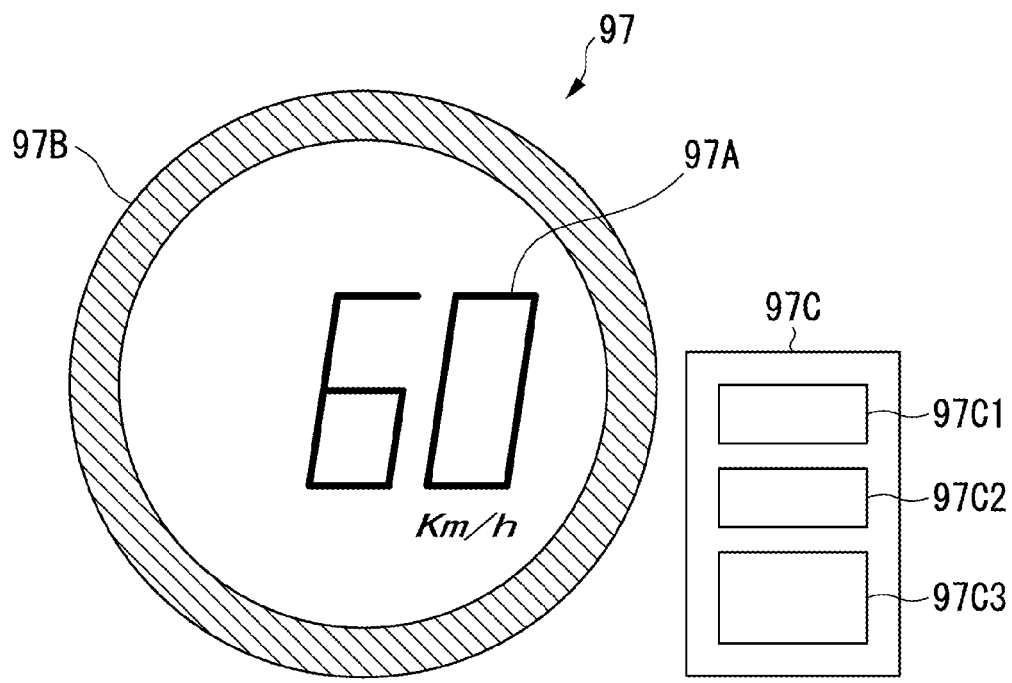
FIG. 6 is a diagram showing an example of an image displayed on the in-wheel area display.
Figure 7:
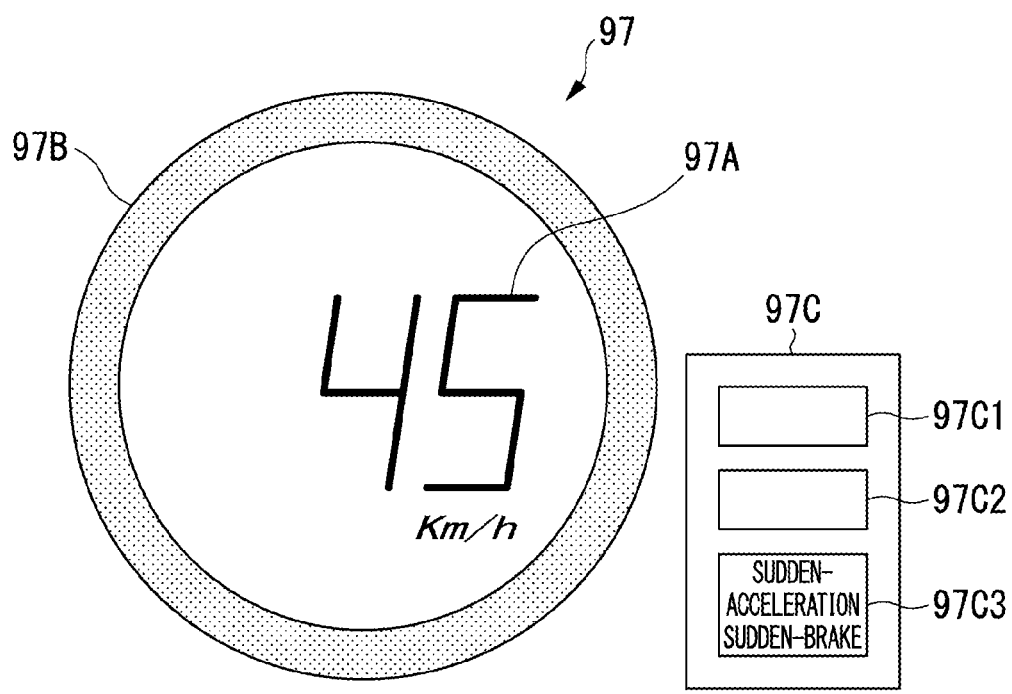
FIG. 7 is a diagram showing an example of an image displayed on the in-wheel area display.

Next, examples of the vehicle speed image, the deterioration display image, and the maximum influence factor image displayed on the in-wheel area display 97 will be described. FIGS. 6 and 7 are diagrams showing examples of images displayed on the in-wheel area display 97. Here, a state in which the maximum influence factor display switch 90A is operated is shown.

For example, FIG. 6 shows an example of an image displayed on the in-wheel area display 97 in a state in which the vehicle 10 is traveling at 60 km/h, the deterioration level of the deterioration influence degree of the battery 40 is the first deterioration level Lv1, and there is no maximum influence factor. In this case, a text image of "60 km/h" is displayed in the vehicle speed image 97A and a display color of "green" is displayed in the deterioration display image 97B. Only the frames of all the high-temperature image 97C1, the full-charge image 97C2, and the sudden-acceleration sudden-brake image 97C3 are displayed in the maximum influence factor image 97C.

For example, FIG. 7 shows an example of an image displayed on the in-wheel area display 97 in a state in which the vehicle 10 is traveling at 45 km/h, the deterioration level of the deterioration influence degree of the battery 40 is the third deterioration level Lv3, and the maximum influence factor is "sudden-acceleration sudden-brake." In this case, a text image of "45 km/h" is displayed in the vehicle speed image 97A and a display color of "blue" is displayed in the deterioration display image 97B. A text image of the sudden-acceleration sudden-brake image 97C3 is displayed brightly and only the frames of the high-temperature image 97C1 and the full-charge image 97C2 are displayed in the maximum influence factor image 97C.

FIGS. 6 and 7 show examples in which the maximum influence factor display switch 90A is operated, but the maximum influence factor display switch 90A may not be operated in some cases. In this case, even in one of the states of FIGS. 6 and 7, only the frames of all the high-temperature image 97C1, the full-charge image 97C2, and the sudden-acceleration sudden-brake image 97C3 are displayed in the maximum influence factor image 97C.

According to the above-described first embodiment, as described above, the deterioration display image 97B is displayed with a display color in accordance with the deterioration level of the deterioration influence degree of the battery 40. Therefore, since a current deterioration influence degree of the battery 40 can be understood, the user keeps a process of lowering the deterioration influence degree in mind. Accordingly, it is possible to inhibit the progress of the deterioration of the battery 40. Since the deterioration display image 97B indicates the deterioration level of the deterioration influence degree of the battery 40 with the display color, the user can easily understand the deterioration level.

In the first embodiment, the maximum influence factor is displayed. Therefore, the user can recognize which state increases the deterioration influence degree, and thus can recognize specific measures to inhibit the progress of the deterioration of the battery 40. As a result, it is possible to coach the user so that the user can be aware of inhibiting the deterioration of the battery 40. For example, when the deterioration level of the deterioration influence degree is high and the high-temperature image 97C1 is displayed brightly, the user can recognize that the progress of the deterioration of the battery 40 can be inhibited when the temperature of the battery 40 is lowered.

Second Embodiment

Figure 8:
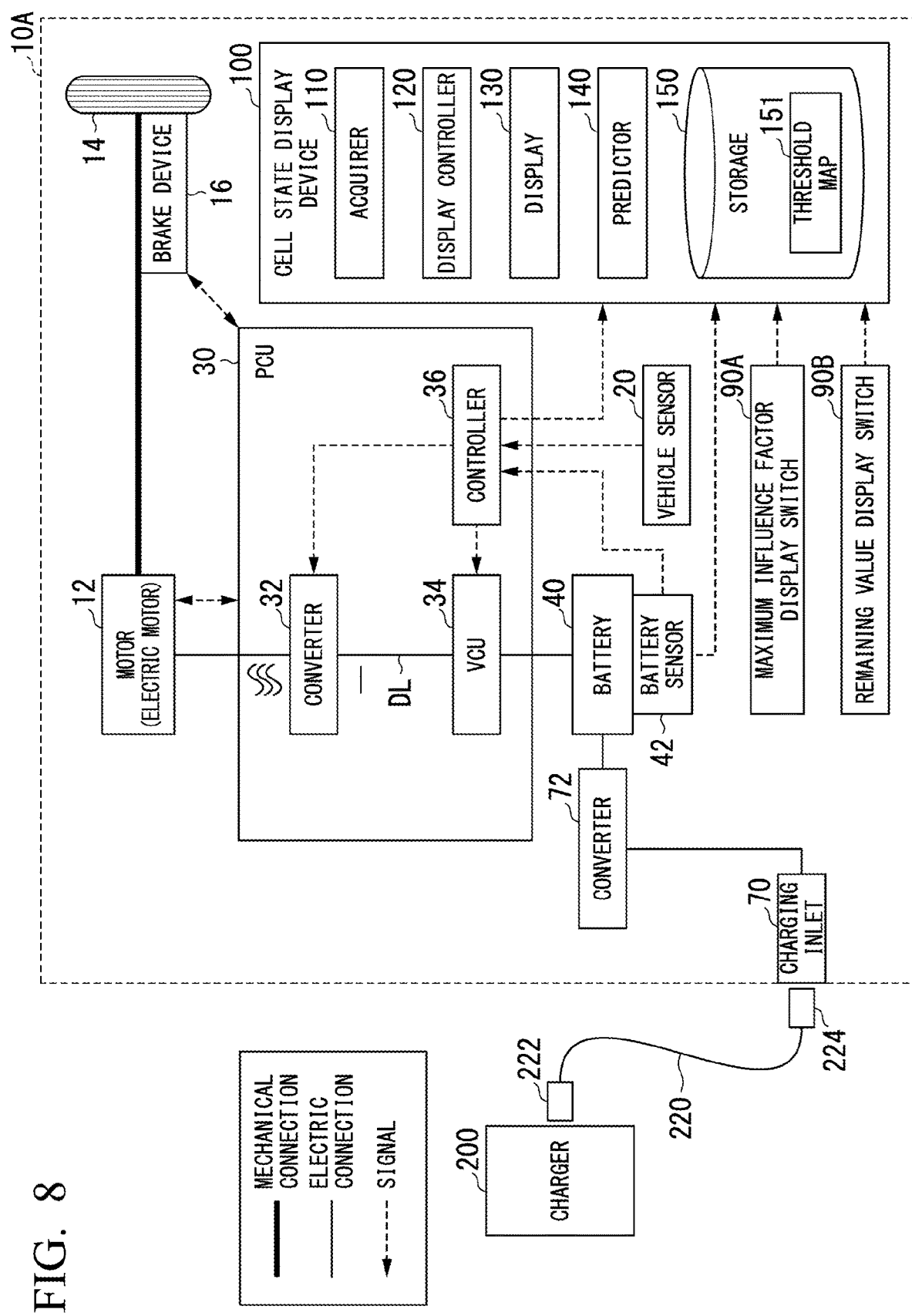
FIG. 8 is a diagram showing an example of a configuration of a vehicle according to a second embodiment.

Next, a second embodiment will be described. FIG. 8 is a diagram showing an example of a configuration of a vehicle 10A according to the second embodiment. The configuration in the second embodiment differs the configuration in the first embodiment mainly in that the vehicle 10A includes a remaining value display switch 90B and an influence degree display device 100A includes a predictor 140.

Figure 9:
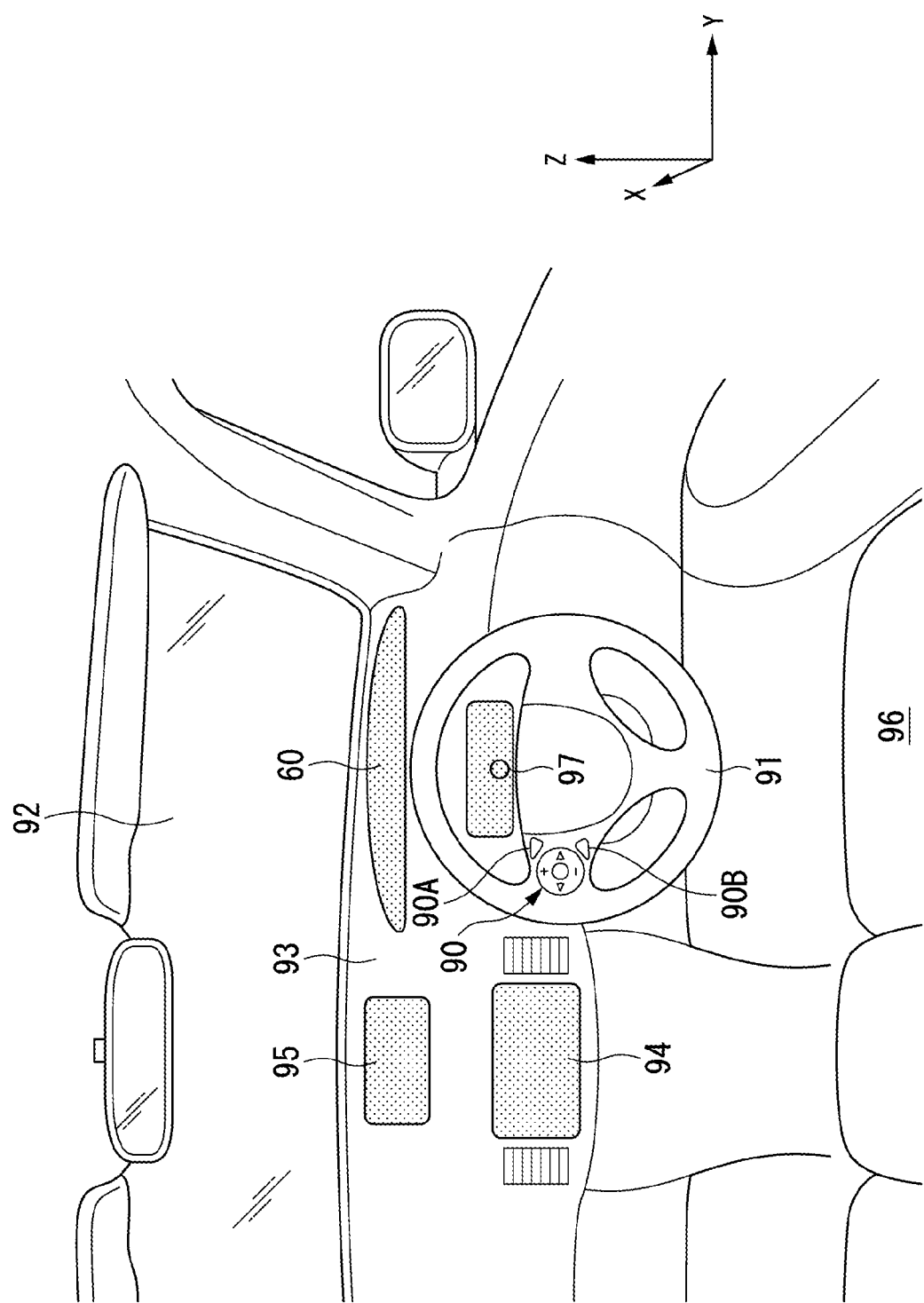
FIG. 9 is a diagram showing a configuration of an interior of the vehicle according to the second embodiment.

As shown in FIG. 9, the remaining value display switch 90B outputs a remaining value display information for causing the influence degree display device 100A to display a remaining value image to the influence degree display device 100A, for example, in response to a pressing operation by a driver. FIG. 9 is a diagram showing the interior of the vehicle 10A according to the second embodiment. As shown in FIG. 9, the remaining value display switch 90B is disposed, for example, in a right end in the steering switch 90 and below the maximum influence factor display switch 90A.

The predictor 140 predicts a future remaining value of the battery 40. The predictor 140 predicts, for example, a remaining value of the battery 40 after a preset number of years of the user as the future remaining value of the battery 40. The remaining value of the battery 40 is calculated based on, for example, a deterioration state of the battery 40 and the remaining value decreases as the degree of deterioration of the battery 40 is severe.

The remaining value of the battery 40 is obtained as, for example, a value proportional to a full charge capacity of the battery 40 and the remaining value at a predetermined time point is obtained as, for example, a ratio of the full charge capacity of the battery 40 at the predetermined time point to the full charge capacity of the battery 40 at an initial time point. Specifically, when the fully charged capacity of the battery 40 at the initial time point is 40 kWh and the full charge capacity at the predetermined time point is 30 kWh, the degree of deterioration of the battery 40 at the predetermined time point is 25% and the remaining value is 75%.

The predictor 140 predicts a remaining value of the battery 40 based on the degree of influence of the battery 40 calculated by the display controller 120. In the prediction of the remaining value of the battery 40, for example, a predicted value (a battery capacity maintenance ratio) based on a past history of the same kind of battery of the same vehicle model can be used. Therefore, the predictor 140 predicts a remaining value of the battery 40 after the number of years set by the user when the battery 40 is used in a current state. Accordingly, the predicted remaining value varies depending on the current state of the battery 40.

The predictor 140 acquires an average value as a representative value of remaining values of a plurality of batteries including the battery 40 after the number of years set by the user. The average value of the remaining values of the plurality of batteries may be stored in advance in the storage 150 or the average value transmitted by an external server or the like via a communication device (not shown) may be received and acquired. The representative value may be a numerical value such as a mode or a median other than the average value.

A population for obtaining the average value of the remaining values of the plurality of batteries may be configured as any classification. For example, the population may be all the batteries, may be configured by the same types of batteries as the battery 40, or may be configured by batteries made by the same maker as the battery 40. The predictor 140 outputs the predicted remaining value of the battery 40 and the average value of the remaining values of the batteries 40 to the display controller 120.

Figure 10:
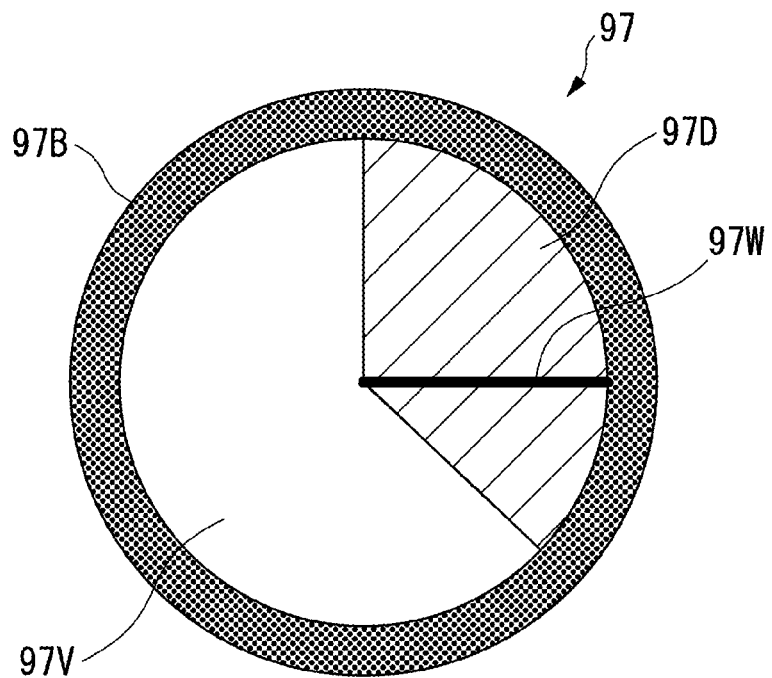
FIG. 10 is a diagram showing an image displayed on an in-wheel area display.
Figure 11:
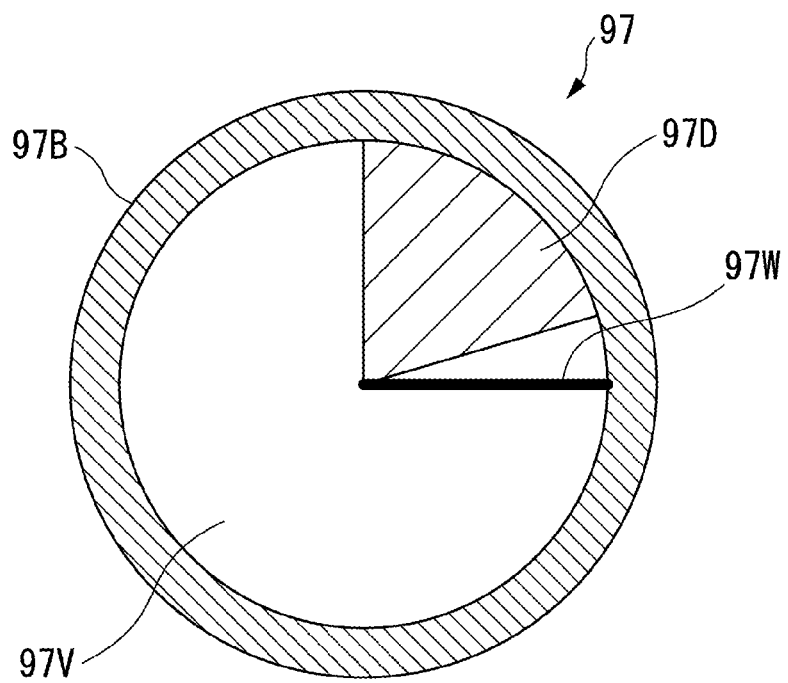
FIG. 11 is a diagram showing an image displayed on the in-wheel area display.

When remaining value display information is output by the remaining value display switch 90B, the display controller 120 causes the display 130 to display a remaining value average value image and a remaining value image based on the average value of the remaining values of the battery 40 and the remaining value of the battery 40 output by the predictor 140. FIGS. 10 and 11 are diagrams showing examples of images displayed on the in-wheel area display 97. Here, states in which the maximum influence factor display switch 90A and the remaining value display switch 90B are operated are shown. When remaining value display information is not output by the remaining value display switch 90B, the vehicle speed image 97A (see FIG. 4) is displayed as in the first embodiment. Accordingly, an image to be displayed on the display 130 is switched between, for example, a vehicle speed image and a remaining value image through an operation on the remaining value display switch 90B.

The display controller 120 causes the display 130 to display a deterioration degree image 97D, a remaining value image 97V, and a remaining value average value image 97W in an area in which the vehicle speed image 97A is displayed in FIG. 4. In approximation of a circular area surrounded by the deterioration display image 97B in a circle graph, the deterioration degree image 97D is displayed in a clockwise area when viewed from a straight line extending in the direction of 12:00 in the circle graph and the remaining value image 97V is displayed in a counterclockwise area when viewed from the straight line. The remaining value average value image 97W is displayed as a straight line which indicates an average value (=100−average value of deterioration degrees) of the remaining values of the plurality of batteries.

For example, FIG. 10 shows an example of an image displayed on the in-wheel area display 97 in a state in which the deterioration level of the deterioration influence degree of the battery 40 is the fourth deterioration level Lv4 and the user sets the time of year after 5 years from an initial time point as the time of year in which the remaining value of the battery 40 is displayed. In the examples of FIGS. 10 and 11, the maximum influence factor image 97C shown in FIG. 4 is not displayed, but the maximum influence factor image 97C may be displayed. The number of years set by the user is not displayed on the in-wheel area display 97, but the number of years set by the user may be displayed on the in-wheel area display 97.

In this case, the deterioration display image 97B, the deterioration degree image 97D, the remaining value image 97V, and the remaining value average value image 97W are displayed on the in-wheel area display 97. The deterioration display image 97B is displayed with the display color of "red." At this time, the deterioration degree image 97D is displayed in an area occupying about 33% of the circle graph and the remaining value image 97V is displayed in an area occupying about 67% of the circle graph. Therefore, when a use state of the battery 40 in a current state continues, the user can be informed that the remaining value of the battery 40 after 5 years of the battery 40 decreases. The remaining value average value image 97W is displayed at a position at which the remaining value of the battery 40 is about 75%. Therefore, when the use state of the battery 40 in the current state continues, the user can be informed that the remaining value of the battery 40 is interior to the average value of the entire battery.

For example, FIG. 11 shows an example of an image displayed on the in-wheel area display 97 in a state in which the deterioration level of the deterioration influence degree of the battery 40 is the first deterioration level Lv1 and the user sets the time of year after 5 years from the initial time point as the time of year in which the remaining value of the battery 40 is displayed. In this case, the deterioration display image 97B displayed on the in-wheel area display 97 is displayed with the display color of "green." At this time, the deterioration degree image 97D is displayed in an area occupying about 20% of the circle graph and the remaining value image 97V is displayed in an area occupying about 80% of the circle graph. Therefore, when a use state of the battery 40 in a current state continues, the user can be informed fact that the remaining value of the battery 40 after 5 years of the battery 40 increases. The remaining value average value image 97W is displayed at a position at which the remaining value of the battery 40 is about 75%. Therefore, when the use state of the battery 40 in the current state continues, the user can be informed that the remaining value of the battery 40 is superior to the average value of the entire battery.

According to the above-described second embodiment, as in the first embodiment, since the user can be informed of a current deterioration influence degree of the battery 40, the user can be aware of a process of lowering the deterioration influence degree. In the second embodiment, the remaining value of the battery 40 is displayed along with the deterioration influence degree of the battery 40. Therefore, the user can be informed of the future remaining value of the battery 40 when the battery 40 is used in the current state.

The embodiments for carrying out the present invention have been described above, but the present invention is not limited to the embodiments. Various modifications and substitutions can be made within the scope of the present invention without departing from the gist of the present invention.

What is claimed is:

1. An influence degree display device comprising:
   a display;
   a memory; and
   a central processing unit connected to the memory, the central processing unit being configured to:
   acquire, based on sensor data associated with one or more sensor device, first information regarding magnitude of a plurality of influence factors that have an influence on progress of deterioration of a secondary cell that stores power used to drive an electric motor vehicle; and
   cause the display to display first image indicating a degree of influence on the progress of the deterioration of the secondary cell in accordance with the acquired magnitude of the plurality of influence factors, the first image also indicating a maximum influence factor, among the plurality of influence factors, that has most influence on the progress of deterioration of the secondary cell, the first image being displayed, on the display, along with second information that relates to the maximum influence factor,
   wherein the central processing unit is configured to display the first image and the second information on the display without displaying second image that indicates an influence factor other than the maximum influence factor.

2. The influence degree display device according to claim 1, wherein the plurality of influence factors are obtained by digitizing content of a driving operation by a driver of the electric motor vehicle.

3. The influence degree display device according to claim 1, wherein one of the plurality of influence factors is a power storage amount of the secondary cell.

4. The influence degree display device according to claim 1, wherein one of the plurality of influence factors is a temperature of the secondary cell.

5. The influence degree display device according to claim 1, wherein the first image indicates that which predetermined operation the maximum influence factor is based on.

6. The influence degree display device according to claim 1, wherein the central processing unit is configured to cause the display to display the first image by changing a display color of the first image in accordance with the magnitude of the maximum influence factor.

7. The influence degree display device according to claim 1,
   wherein the central processing unit is configured to predict a future remaining value of the secondary cell, and
   wherein the central processing unit is configured to cause the display to display third image which is based on the future remaining value of the secondary cell.

8. The influence degree display device according to claim 7, wherein, in a case where an operation is performed on a remaining value display switch, the central processing unit is configured to cause the display to display the third image along with the first image.

9. An influence degree display method using a computer, comprising:
   acquiring, based on sensor data associated with one or more sensor device, first information regarding magnitude of a plurality of influence factors that have an influence on progress of deterioration of a secondary cell that stores power used to drive an electric motor vehicle; and
   causing a display to display first image indicating a degree of influence on the progress of the deterioration of the secondary cell in accordance with the acquired magnitude of the plurality of influence factors, the first image also indicating a maximum influence factor, among the plurality of influence factors, that has most influence on the progress of deterioration of the secondary cell, the first image being displayed, on the display, along with second information that relates to the maximum influence factor, wherein the first image and the second information are displayed on the display without displaying second image that indicates an influence factor other than the maximum influence factor.

10. A computer-readable non-transitory storage medium that stores a program causing a computer:

to acquire, based on sensor data associated with one or more sensor device, first information regarding magnitude of a plurality of influence factors that have an influence on progress of deterioration of a secondary cell that stores power used to drive an electric motor vehicle; and to cause a display to display first image indicating a degree of influence on the progress of the deterioration of the secondary cell in accordance with the acquired magnitude of the plurality of influence factors, the first image also indicating a maximum influence factor, among the plurality of influence factors, that has most influence on the progress of deterioration of the secondary cell, the first image being displayed, on the display, along with second information that relates to the maximum influence factor, wherein the first image and the second information are displayed on the display without displaying second image that indicates an influence factor other than the maximum influence factor.

* * * * *